(No Model.)
A. H. KINDER.
BRAIDING DEVICE FOR SEWING MACHINES.
No. 437,816. Patented Oct. 7, 1890.
*Fig. 1*
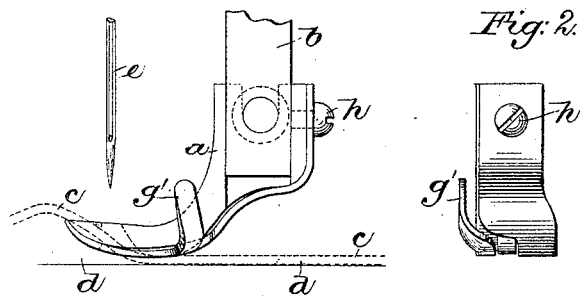
*Fig. 2.*
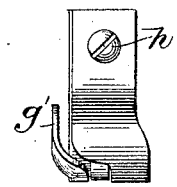
*Fig. 3*     *Fig. 5.*
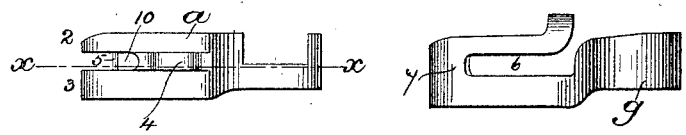
*Fig. 4.*
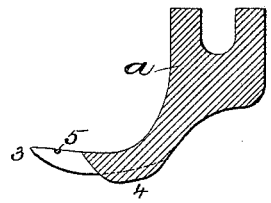
Witnesses
Arthur S. Davis
Frederick L. Emery
Inventor:
Arthur H. Kinder,
by Crosby & Gregory
Attys

UNITED STATES PATENT OFFICE.

ARTHUR HOUSTON KINDER, OF BOSTON, MASSACHUSETTS, ASSIGNOR OF ONE-HALF TO OLINDUS F. KENDALL, OF SAME PLACE.

BRAIDING DEVICE FOR SEWING-MACHINES.

SPECIFICATION forming part of Letters Patent No. 437,816, dated October 7, 1890.

Application filed February 10, 1890. Serial No. 339,847. (No model.)

*To all whom it may concern:*

Be it known that I, ARTHUR HOUSTON KINDER, of Boston, county of Suffolk, State of Massachusetts, have invented an Improvement in Braiding Attachments for Presser-Feet, of which the following description, in connection with the accompanying drawings, is a specification, like letters and figures on the drawings representing like parts.

The presser-feet of sewing-machines have been provided with various forms of devices by which to guide braid to be stitched by the needle and complemental parts to the fabric under the presser-foot.

This invention has for its object to provide a braiding attachment in which the braid may be readily put in place without threading its end through a hole.

My braiding attachment consists of a bifurcated presser-foot having a longitudinal teat or keel at its under side and a spring-plate shaped to fit the under side of the foot and straddle the longitudinal teat or keel thereof, leaving a space between the end of the slot in the plate and the end of the keel nearest the front end of the presser-foot, in which the needle descends, the said plate having a horn or lip extended up alongside of the presser-foot, down between which horn and the presser-foot the braid is passed, and is thence drawn laterally into the line of the slot in the plate and under the keel and into the slot at the bifurcated end of the presser-foot.

My invention also consists in a braiding attachment consisting of a presser-foot bifurcated at its front end and having a needle-hole, combined with a plate connected thereto and having a horn and lateral slot near it to permit the braid to be drawn into position under the presser-foot and needle-hole, all as will be described.

Figure 1 in side elevation represents a presser-foot braid-guiding attachment embodying my invention and a needle, the braid being in position on the material. Fig. 2 is a rear side elevation of the foot shown in Fig. 1; Fig. 3, an under side view of the presser-foot alone; Fig. 4, a section in the line $x\,x$, Fig. 3; and Fig. 5, an under side view of the spring-plate detached.

The presser-foot $a$, adapted to be secured in any usual manner to the presser-foot bar $b$, is slotted or bifurcated at its front end to leave two toes or projections 2 3, and has a needle-hole 10, and preferably a teat or keel 4, extended below the general level of the foot in the line of the stitching, the teat or keel bearing on the braid $c$ after it has been stitched to the material $d$ by a thread carried by the needle $e$, and preferably the foot will have a cross-bar 5 to cross above the braid and prevent it from being lifted by the ascending needle.

The spring-plate $g$ is slotted at 6, said slot extending out through the side of the plate, and part of the plate is bent to form a horn $g'$, which is extended up along one side of the foot, as best shown in Fig. 1, the said horn being preferably back of the stitching-point.

The plate is attached to the foot by a screw $h$, and, as shown, embraces the teat or keel, as in Fig. 1, the cross bar or toe 7 of the plate crossing the space left between the toes 2 3 and serving as a bridge to keep the braid up from the material $d$ in advance of the descent of the needle through the braid.

To introduce the braid or to remove it the operator has only to slip the braid edgewise between the horn and the side of the presser-foot and draw it into position between the toes 2 3 and under the keel 4. The braid may be inserted or removed almost instantaneously, and very much time is saved the operator. The use of the teat or keel is preferable, although it might be omitted, and so, also, the length of the longitudinal slot may be more or less, as desired.

I claim—

1. The herein-described braiding attachment, consisting of a presser-foot bifurcated at its front end and having a longitudinal keel in the line of the slot in the foot, combined with a plate slotted longitudinally and laterally and connected thereto and having a bridge-piece 7 and a horn $g'$, the latter extended up alongside the presser-foot, to operate substantially as described.

2. The herein-described braiding attachment, consisting of a presser-foot bifurcated at its front end and having a needle-hole, combined with the plate connected thereto and having a horn and lateral slot near it to permit the braid to be drawn into position under the needle-hole of the presser-foot, substantially as described.

In testimony whereof I have signed my name to this specification in the presence of two subscribing witnesses.

ARTHUR HOUSTON KINDER.

Witnesses:
GEO. W. GREGORY,
A. S. WIEGAND.